(12) United States Patent
Kim et al.

(10) Patent No.: US 11,551,033 B2
(45) Date of Patent: Jan. 10, 2023

(54) APPARATUS FOR LEARNING IMAGE OF VEHICLE CAMERA AND METHOD THEREOF

(71) Applicants: HYUNDAI MOTOR COMPANY, Seoul (KR); KIA MOTORS CORPORATION, Seoul (KR)

(72) Inventors: Jong Mo Kim, Goyang-si (KR); Jin Wook Choi, Goyang-si (KR); Ha Yeon Lee, Gwacheon-si (KR); Jun Sik An, Seoul (KR); Min Sung Son, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 134 days.

(21) Appl. No.: 16/931,061

(22) Filed: Jul. 16, 2020

(65) Prior Publication Data
US 2021/0158091 A1     May 27, 2021

(30) Foreign Application Priority Data
Nov. 22, 2019   (KR) .................. 10-2019-0151422

(51) Int. Cl.
| | |
|---|---|
| *G06K 9/62* | (2022.01) |
| *H04N 5/225* | (2006.01) |
| *G06T 3/60* | (2006.01) |
| *G06T 7/11* | (2017.01) |

(52) U.S. Cl.
CPC .......... *G06K 9/6256* (2013.01); *G06K 9/6261* (2013.01); *G06T 3/60* (2013.01); *G06T 7/11* (2017.01); *H04N 5/2253* (2013.01); *G06T 2207/20081* (2013.01); *G06T 2207/20132* (2013.01)

(58) Field of Classification Search
CPC .. G06K 9/6256; G06K 9/6261; G06K 9/6271; G06T 2207/20081; G06T 2207/20132; G06T 3/60; G06T 7/11; G06V 10/267; G06V 10/82; G06V 20/56; G06N 3/08
See application file for complete search history.

(56) References Cited

U.S. PATENT DOCUMENTS

| | | | |
|---|---|---|---|
| 2020/0090322 A1* | 3/2020 | Seo ...................... | G06K 9/6267 |
| 2020/0193157 A1* | 6/2020 | Soni ..................... | G06K 9/6256 |

* cited by examiner

*Primary Examiner* — Ruiping Li
(74) *Attorney, Agent, or Firm* — Lempia Summerfield Katz LLC

(57) ABSTRACT

An apparatus for learning an image of a vehicle camera and a method thereof are provided to apply a result of deep learning to all vehicles regardless of the color of a vehicle and the mounting angle (e.g., yaw, roll and pitch) of a camera. The apparatus includes an image input device that inputs an image photographed by a camera mounted on a vehicle, and a controller that masks a fixed area in the image input from the image input device with a pattern image, converts the masked image into a plurality of images having different views, and performs deep learning by using the masked image and the converted plurality of images.

14 Claims, 17 Drawing Sheets

APPARATUS FOR LEARNING IMAGE OF VEHICLE CAMERA AND METHOD THEREOF

CROSS-REFERENCE TO RELATED APPLICATION

This application claims priority to and the benefit of Korean Patent Application No. 10-2019-0151422, filed on Nov. 22, 2019, the entire contents of which are incorporated herein by reference.

FIELD

The present disclosure relates to a technique for performing deep learning by using an image obtained through a camera mounted on a vehicle.

BACKGROUND

The statements in this section merely provide background information related to the present disclosure and may not constitute prior art.

In general, deep learning (or a deep neural network), which is a type of machine learning, may be composed of artificial neural networks (ANNs) of several layers between an input and an output. Such an artificial neural network may include a convolutional neural network (CNN) or a recurrent neural network (RNN) according to a structure, a problem, a purpose to be solved, and the like.

The deep learning is used to solve various problems such as classification, regression, localization, detection, segmentation, and the like. In particular, in an autonomous driving system, semantic segmentation and object detection, which can distinguish the location and type of a dynamic and static obstacle, are important.

The semantic segmentation performs segmentation prediction in units of pixels and dividing the image in units of pixels of identical meaning in order to detect an object in an image, and thus, it is possible to not only identify which object is present in the image but also exactly pinpoint the positions of pixels having the same meaning (the same object).

Object detection means classifying and predicting the type of an object in an image to find location information of the object by regression prediction of a bounding box, and it is possible to understand not only what type of the object is in the image differently from simple classification but also location information of the object.

We have discovered that since the conventional technique performs deep learning by using an image obtained through a camera mounted on a vehicle, the obtained image is dependent on the color of the specific vehicle and the mounting angle (yaw, roll and pitch) of the camera. Thus, when the result of deep learning (e.g., a semantic image segmentation model) is applied to another vehicle, the conventional technique does not exhibit normal recognition performance because the obtained image includes a partial image of the specific vehicle, and the color of the specific vehicle affects the learning.

We have also found that because the colors of vehicles are different from each other and the views are different from each other according to the mounting angle of the camera, there is a limit to applying the result of deep learning based on an image obtained through a camera mounted on a specific vehicle to other vehicles.

The matters described in this background section are intended to promote an understanding of the background of the disclosure and may include matters that are not already known to those of ordinary skill in in the art.

SUMMARY

The present disclosure has been made to solve the above-mentioned problems occurring in the related art while advantages achieved by the related art are maintained intact.

An aspect of the present disclosure provides an apparatus for learning an image of a vehicle camera and a method thereof, which can apply a result of deep learning to all vehicles regardless of the color of a vehicle and the mounting angle (yaw, roll and pitch) of a camera by masking a fixed area with a pattern image in an image acquired through a camera mounted on a vehicle, converting the masked image into a plurality of images having different views, and performing deep learning by using the masked image and the converted plurality of images.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for learning an image of a vehicle camera includes: an image input device that inputs an image photographed by a camera mounted on a vehicle, and a controller that masks a fixed area in the image with a pattern image, converts the masked image into a plurality of images having different views, and performs deep learning by using the masked image and the converted plurality of images.

The image input device may input, to the controller, at least one of a front image, a rear image, a left image, or a right image photographed by the camera installed at the vehicle.

The controller may generate a first learning image by masking the fixed area in the image received from the image input device, a second learning image by rotating the image received from the image input device by a reference angle and masking the fixed area in the rotated image, a third learning image by cropping the first learning image, and a fourth learning image by cropping the second learning image.

The controller may perform the deep learning based on at least one image among the first, second, third, and fourth learning images.

The controller may multiply the image input from the image input device by a binary mask image to generate a first image in which the fixed area is removed, invert the binary mask image to generate an inverse binary mask image, multiply the pattern image by the inverse binary mask image to generate a second image in which the fixed area is composed of the pattern image, and add the first image and the second image to generate the first learning image in which the fixed area in the image input from the image input device is replaced with the pattern image.

The controller may rotate the image input from the image input device by the reference angle, rotate a binary mask image by the reference angle, multiply the reference angle rotated image by the reference angle rotated binary mask image to generate a first image in which the fixed are is removed, invert the binary mask image to generate an inverse binary mask image, multiply the pattern image by the inverse binary mask image to generate a second image in which the fixed area is the pattern image, and add the first image to the second image to generate the second learning image in which the fixed area in the reference angle rotated image is replaced with the pattern image.

The controller may rotate the image input from the image input device in a clockwise direction by the reference angle, generate the second learning image by masking the fixed area in the rotated image, and generate the fourth learning image by cropping the generated second learning image.

The controller may rotate the image received from the image input device in a counterclockwise direction by the reference angle, generate the second learning image by masking the fixed area in the rotated image, and generate the fourth learning image by cropping the generated second learning image.

According to another aspect of the present disclosure, a method of learning an image of a vehicle camera includes: inputting, by an image input device, an image photographed by a camera mounted on a vehicle, masking, by a controller, a fixed area in the input image with a pattern image and converting the masked image into a plurality of images having different views, and performing, by the controller, deep learning by using the masked image and the converted plurality of images.

The inputting of the image may include inputting a front image of the vehicle, inputting a rear image of the vehicle, inputting a left image of the vehicle, and inputting a right image of the vehicle.

The converting of the masked image into the plurality of images having different views may include: generating a first learning image by masking the fixed area in the image input from the image input device, generating a second learning image by rotating the image input from the image input device by a reference angle and masking the fixed area in the rotated image, generating a third learning image by cropping the first learning image, and generating a fourth learning image by cropping the second learning image.

The performing of the deep learning may include performing the deep learning based on at least one image among the first, second, third and fourth learning images.

The generating of the first learning image may include multiplying the image input from the image input device by a binary mask image to generate a first image from which the fixed area is removed, inverting the binary mask image to generate an inverse binary mask image, multiplying the pattern image by the inverse binary mask image to generate a second image in which the fixed area is composed of the pattern image, and adding the first image and the second image to generate the first learning image in which the fixed area in the image input from the image input device is replaced with the pattern image.

The generating of the second learning image may include rotating the image input from the image input device by a reference angle, rotating a binary mask image by the reference angle, multiplying the reference angle rotated image by the reference angle rotated binary mask image to generate a first image in which the fixed area is removed, inverting the binary mask image to generate an inverse binary mask image, multiplying the pattern image by the inverse binary mask image to generate a second image in which the fixed area is the pattern image, and adding the first image to the second image to generate a second learning image in which the fixed area in the reference angle rotated image is replaced with the pattern image.

The generating of the fourth learning image may include rotating the image input from the image input device in a clockwise direction by a reference angle, and generating the fourth learning image by cropping the second learning image generated by masking the fixed area in the rotated image.

The generating of the fourth learning image may include rotating an image received from the image input device in a counterclockwise direction by a reference angle, and generating the fourth learning image by cropping the second learning image generated by masking the fixed area in the rotated image.

According to still another aspect of the present disclosure, a method of learning an image of a vehicle camera includes: inputting, by an image input device, an image photographed by a camera mounted on a vehicle; randomly performing, by a controller, at least one operation among a plurality of operations, wherein the plurality of operations includes: a first operation of generating a learning image by masking a fixed area in the input image, a second operation of generating a learning image by rotating the input image input by a reference angle and masking the fixed area in the rotated image, a third operation of generating an image by masking the fixed area in the input image to generate a learning image by cropping the generated image, a fourth operation of generating an image by rotating the input image by the reference angle and masking the fixed area in the input image to generate a learning image by cropping the generated image; and performing, by the controller, deep learning by using the generated learning image.

The first operation may include multiplying the image input from the image input device by a binary mask image to generate a first image from which the fixed area is removed, inverting the binary mask image to generate an inverse binary mask image, multiplying the pattern image by the inverse binary mask image to generate a second image in which the fixed area is composed of the pattern image, and adding the first image and the second image to generate a first learning image in which the fixed area in the image input from the image input device is replaced with the pattern image.

The second operation may include rotating the image input from the image input device by the reference angle, rotating a binary mask image by the reference angle, multiplying the reference angle rotated image by the reference angle rotated binary mask image to generate a first image in which the fixed area is removed, inverting the binary mask image to generate an inverse binary mask image, multiplying the pattern image by the inverse binary mask image to generate a second image in which the fixed area is the pattern image, and adding the first image and the second image to generate a second learning image in which the fixed area in the reference angle rotated image is replaced with the pattern image.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
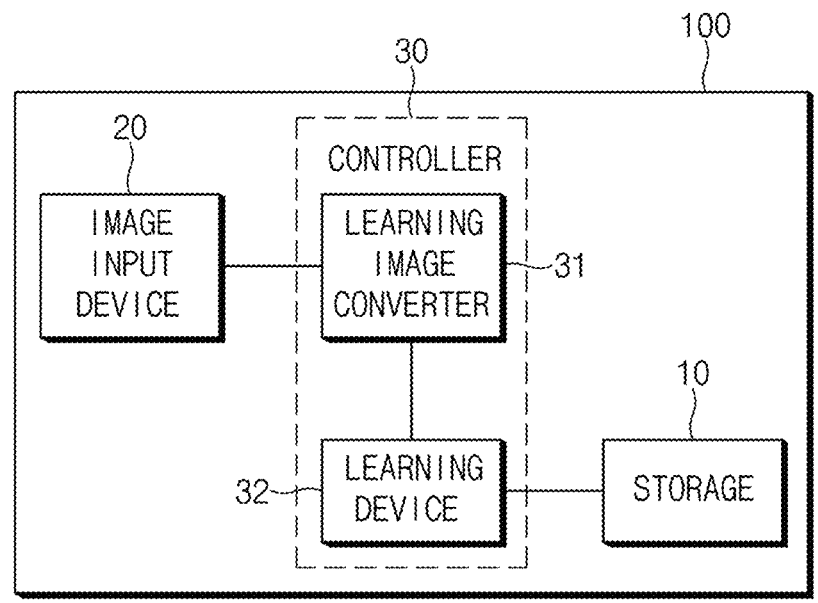
FIG. 1 is a block diagram illustrating an apparatus for learning an image of a vehicle camera in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary foils of the present disclosure, a detailed description of well-known features or functions will be ruled out in order not to unnecessarily obscure the gist of the present disclosure.

In describing the components of the exemplary forms according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific tams, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an apparatus for learning an image of a vehicle camera in one form of the present disclosure.

As shown in FIG. 1, the apparatus 100 for learning an image of a vehicle camera may include: storage 10, an image input device 20, and a controller 30. In this case, according to a scheme of implementing the apparatus 100 for learning an image of a vehicle camera in one form of the present disclosure, components may be combined with each other and implemented as one, or some components may be omitted.

Looking at the respective components, first, the storage 10 may include various logics, algorithms, and programs required in the operations of receiving a front image photographed by a camera installed at a front of the vehicle, a rear image photographed by a camera installed at a rear of the vehicle, a left image photographed by a camera installed at a left side of the vehicle, and a right image photographed by a camera installed at a right side of the vehicle from the image input device 20 as source images, masking a fixed area in the received source image with a pattern image, converting the masked image into a plurality of images having different views, and performing deep learning by using the masked image and the converted plurality of images. In this case, the fixed area, which is an area in which a pixel value does not change in an image, refers to a portion obtained by photographing a housing surrounding a lens of the camera and a portion obtained by photographing a body of a host vehicle. Such a fixed area is information that is known in advance.

The storage 10 may store a pattern image and a binary mask image.

The storage 10 may store a semantic image segmentation model as a result of deep learning performed by the controller 30.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

Next, the image input device 20 inputs, to a learning image converter 31, a front image photographed by a camera installed at the front of the vehicle, a rear image photographed by a camera installed at the rear of the vehicle, a left image photographed by a camera installed at the left side of the vehicle, and a right image photographed by a camera installed at the right side of the vehicle.

the image input device 20 inputs, to a learning image converter 31, at least one of a front image, a rear image, a left image, and a right image photographed by a camera installed at the vehicle.

Next, the controller 30 performs the overall control such that each component can perform its function. The controller 30 may be implemented in the form of hardware or software, or may be implemented in the form of a combination of hardware and software. In one form, the controller 30 may be implemented with a microprocessor, but is not limited thereto.

In another form, the controller 30 may mask a fixed area in the image input from the image input device 20 with a pattern image, convert the masked image into a plurality of images having different views, and perform deep learning by using the masked image and the converted plurality of images.

In other form, the controller 30 may randomly generate one of the masked image and the converted plurality of images at a specific time point.

In detail, the controller 30 may include the learning image converter 31 and a learning device 32.

The learning image converter 31 may generate a first learning image by masking a fixed area in the image input from the image input device 20. That is, the learning image converter 31 may replace the fixed area in the image input from the image input device 20 with a pattern image as a masking operation. In addition, the learning image converter 31 may perform masking on an image acquired through a camera in a test operation, not learning. Because the learning device 32 has performed deep learning based on the masked image, the test image must also be masked.

The learning image converter 31 may rotate the image input from the image input device 20 by an angle in a reference rotation angle range (e.g., −10 degrees to 10 degrees), and mask a fixed area in the rotated image to generate a second learning image. In this case, for example, the learning image converter 31 may rotate the image a total of 20 times in units of one degree within a reference rotation angle range.

The learning image converter 31 may perform a crop that cuts an upper end of the first or second learning image by a reference value (e.g., 30%). That is, the learning image converter 31 may crop the first learning image to generate a third learning image and crop the second learning image to generate a fourth learning image. In this case, the learning image converter 31 may randomly generate one of the first to fourth learning images every learning cycle. In this case, the learning cycle refers to a cycle of learning one image.

The learning device 32 is a module that performs deep learning based on an artificial neural network, and because the deep learning scheme itself is not the subject matter of the present disclosure, any schemes may be utilized, so the detailed description will be omitted.

The learning device 32 may perform deep learning based on at least one of the first to fourth learning images.

Figure 2:
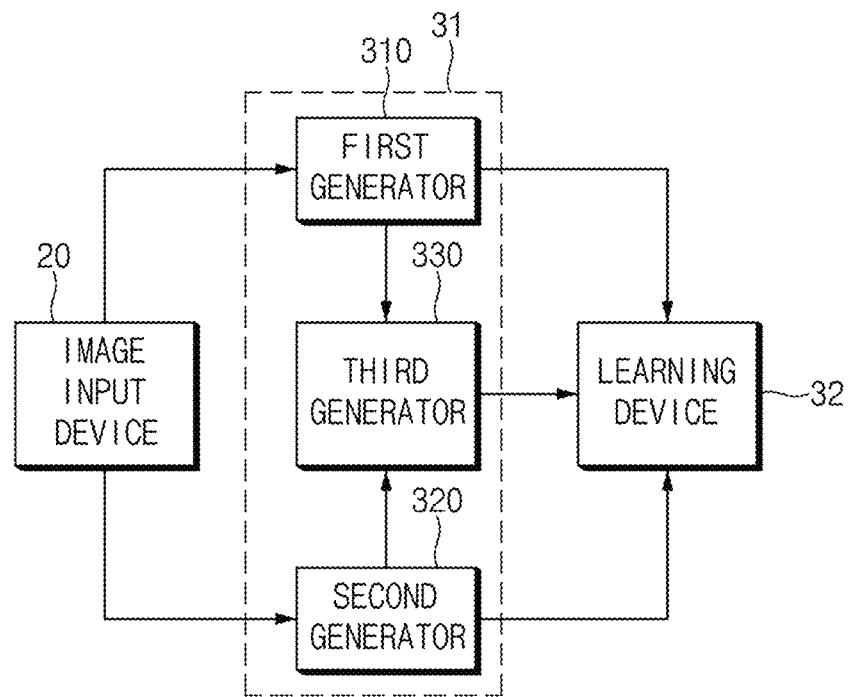
FIG. 2 is a view illustrating a detailed configuration of a learning image converter provided in an apparatus for learning an image of a vehicle camera in one form of the present disclosure.

FIG. 2 is a view illustrating a detailed configuration of a learning image converter provided in an apparatus for learning an image of a vehicle camera in one form of the present disclosure.

As shown in FIG. 2, the learning image converter 31 provided in the apparatus 100 may include a first generator 310, a second generator 320, and a third generator 330.

The first generator 310 may generate a first learning image by masking a fixed area in the image (source image) input from the image input device 20. That is, the first generator 310 may generate the first learning image in which the fixed area in the image input from the image input device 20 is replaced with a pattern image, as a masking process.

Hereinafter, the detailed operation of the first generator 310 will be described with reference to FIGS. 3A to 3F.

Figure 3A:
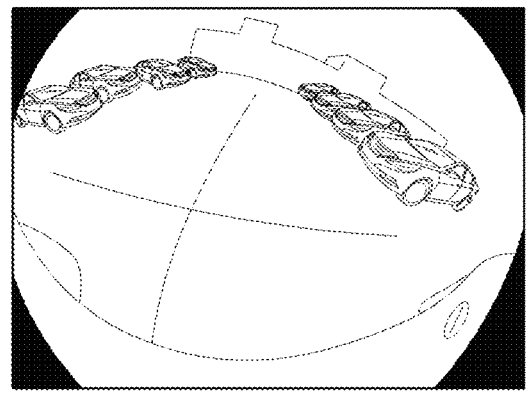
FIG. 3A is a view illustrating an image input from an image input device provided in an apparatus for learning an image of a vehicle camera in one form of the present disclosure.
Figure 3B:
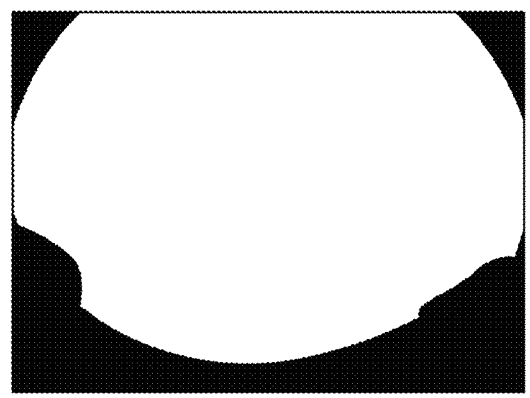
FIG. 3B is a view illustrating a binary mask image provided in an apparatus for learning an image of a vehicle camera in one form of the present disclosure.
Figure 3C:
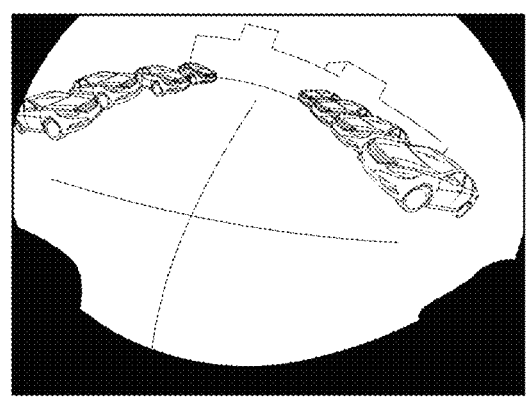
FIG. 3C is a view illustrating a first image pre-processed by the first generator provided in an apparatus for learning an image of a vehicle camera in one form of the present disclosure.
Figure 3D:
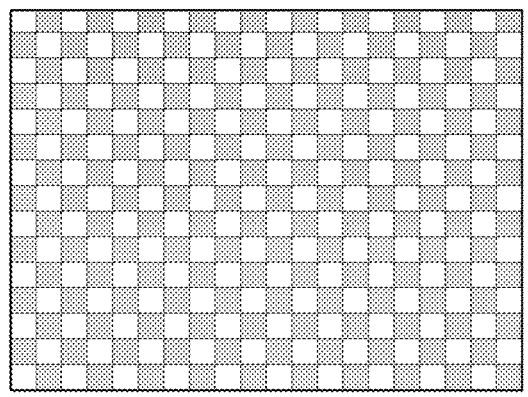
FIG. 3D is a view illustrating a pattern image provided in an apparatus for learning an image of a vehicle camera in one form of the present disclosure.
Figure 3E:
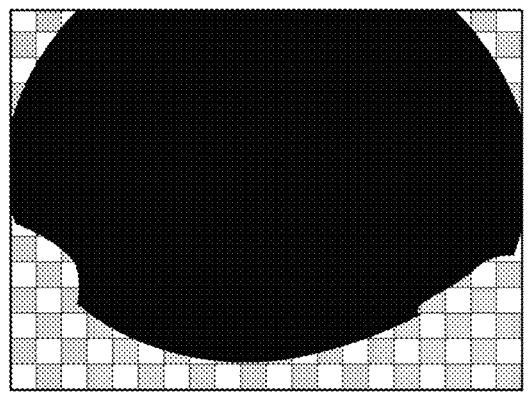
FIG. 3E is a view illustrating a second image pre-processed by a first generator provided in an apparatus for learning an image of a vehicle camera in one form of the present disclosure.
Figure 3F:
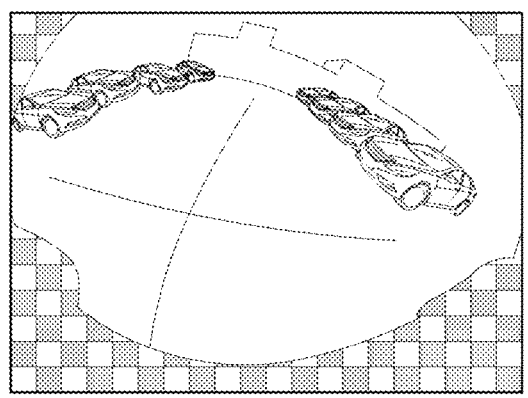
FIG. 3F is a view illustrating the first learning image generated by a first generator provided in an apparatus for learning an image of a vehicle camera in one form of the present disclosure.

FIG. 3A is a view illustrating an image input from the image input device 20 provided in an apparatus for learning an image of a vehicle camera in one form of the present disclosure. FIG. 3B is a view illustrating a binary mask image provided in an apparatus for learning an image of a vehicle camera in one form of the present disclosure. FIG. 3C is a view illustrating a first image pre-processed by the first generator provided in an apparatus for learning an image of a vehicle camera in one form of the present disclosure. FIG. 3D is a view illustrating a pattern image provided in an apparatus for learning an image of a vehicle camera in one form of the present disclosure. FIG. 3E is a view illustrating a second image pre-processed by the first generator provided in an apparatus for learning an image of a vehicle camera in one form of the present disclosure. FIG. 3F is a view illustrating the first learning image generated by the first generator provided in an apparatus for learning an image of a vehicle camera in one form of the present disclosure.

In this case, the binary mask image is divided into a white area having a value of '1' and a black area (fixed area) having a value of '0'.

The first generator 310 multiplies the source image as shown in FIG. 3A by a binary mask image as shown in FIG. 3B to generate a first image as shown in FIG. 3C. In this case, because the white area of the binary mask image has a value of '1', the area in the source image corresponding to the white area is maintained, and because the black area has a value of '0', the area in the source image corresponding to the black area is replaced with a binary mask image. That is, the first image is generated in which the fixed area in the source image is deleted (indicated by a black area).

The first generator 310 inverts the binary mask image to generate an inverse binary mask image, and multiplies the pattern image as shown in FIG. 3D by the inverse binary mask image to generate the second image as shown in FIG. 3E.

The first generator 310 adds the first and second images to generate the first learning image as shown in FIG. 3F in which the fixed area of the source image is replaced with the pattern image.

Hereinafter, the detailed operation of the second generator 320 will be described with reference to FIGS. 4A to 4H.

Figure 4A:
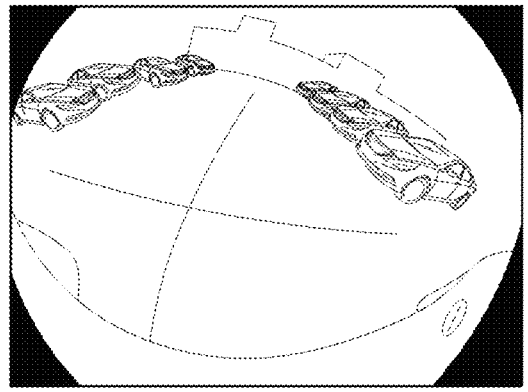
FIG. 4A is a view illustrating a source image input from an image input device provided in an apparatus for learning an image of a vehicle camera in one form of the present disclosure.
Figure 4B:
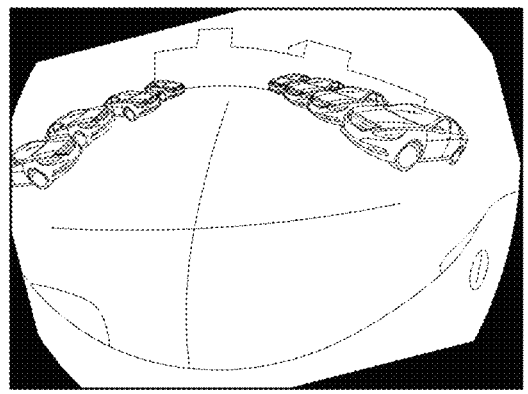
FIG. 4B is a view illustrating a source image rotated at a specified angle by a second generator provided in an apparatus for learning an image of a vehicle camera in one form of the present disclosure.
Figure 4C:
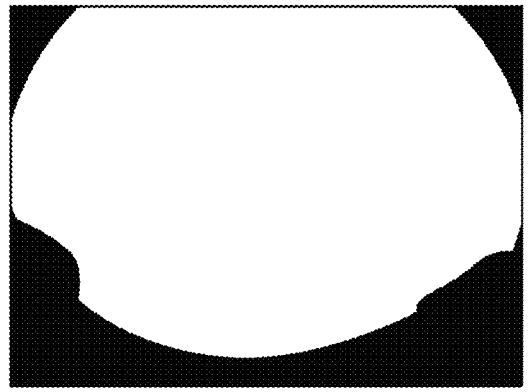
FIG. 4C is a view illustrating a binary mask image provided in an apparatus for learning an image of a vehicle camera in one form of the present disclosure.
Figure 4D:
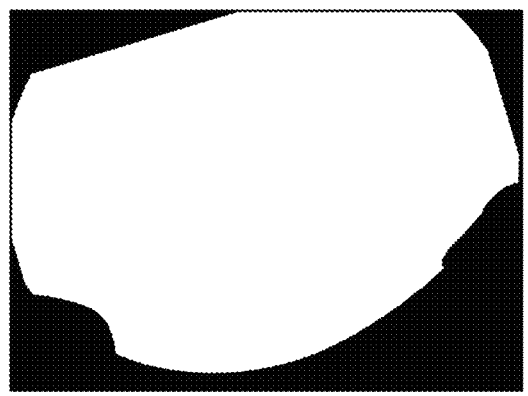
FIG. 4D is a view illustrating a binary mask image rotated at a specified angle by a second generator provided in an apparatus for learning an image of a vehicle camera in one form of the present disclosure.
Figure 4E:
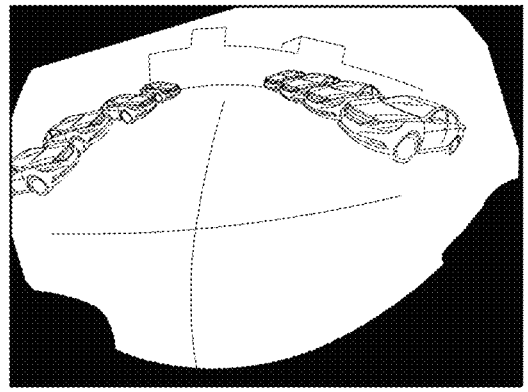
FIG. 4E is a view illustrating a first image pre-processed by a second generator provided in an apparatus for learning an image of a vehicle camera in one form of the present disclosure.
Figure 4F:
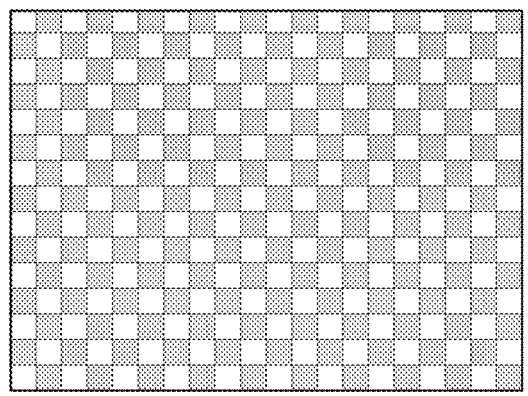
FIG. 4F is a view illustrating a pattern image provided in an apparatus for learning an image of a vehicle camera in one form of the present disclosure.
Figure 4G:
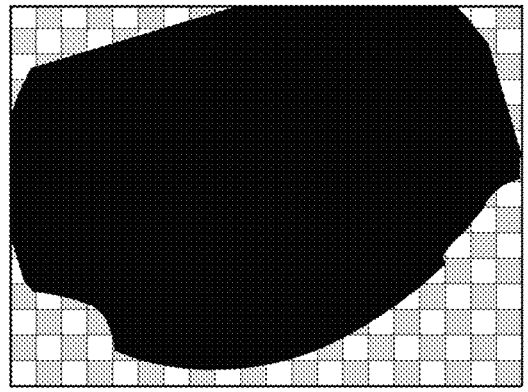
FIG. 4G is a view illustrating a second image pre-processed by a second generator provided in an apparatus for learning an image of a vehicle camera in one form of the present disclosure.
Figure 4H:
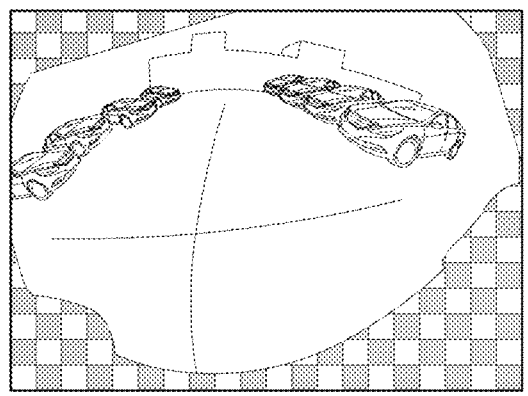
FIG. 4H is a view illustrating a second learning image generated by a second generator provided in an apparatus for learning an image of a vehicle camera in one form of the present disclosure.

FIG. 4A is a view illustrating a source image input from the image input device 20 provided in an apparatus for learning an image of a vehicle camera in one form of the present disclosure. FIG. 4B is a view illustrating a source image rotated at a specified angle by a second generator provided in an apparatus for learning an image of a vehicle camera in one form of the present disclosure. FIG. 4C is a view illustrating a binary mask image provided in an apparatus for learning an image of a vehicle camera in one form of the present disclosure. FIG. 4D is a view illustrating a binary mask image rotated at a specified angle by a second generator provided in an apparatus for learning an image of a vehicle camera in one form of the present disclosure. FIG. 4E is a view illustrating a first image pre-processed by a second generator provided in an apparatus for learning an image of a vehicle camera in one form of the present disclosure. FIG. 4F is a view illustrating a pattern image provided in an apparatus for learning an image of a vehicle camera in one form of the present disclosure. FIG. 4G is a view illustrating a second image pre-processed by a second generator provided in an apparatus for learning an image of a vehicle camera in one form of the present disclosure. FIG. 4H is a view illustrating a second learning image generated by a second generator provided in an apparatus for learning an image of a vehicle camera in one form of the present disclosure.

The second generator 320 rotates the source image shown in FIG. 4A at a specified angle to generate a source image which is rotated at the specified angle and shown in FIG. 4B.

The second generator 320 rotates the binary mask image shown in FIG. 4C at a specified angle to generate a binary mask image which is rotated at the specified angle and shown in FIG. 4D.

The second generator 320 multiplies the source image rotated at a specified angle by a binary mask image rotated at a specified angle to generate a first image shown in FIG. 4E.

The second generator 320 inverts a binary mask image shown in FIG. 4C to generate an inverse binary mask image, and multiplies the pattern image shown in FIG. 4F by the inverse binary mask image to generate a second image shown in FIG. 4G.

The second generator 320 adds the first image and the second image to generate a second learning image shown in FIG. 4H where the fixed area of the source image is replaced with a pattern image and the view is different from that of the source image.

Hereinafter, a detailed operation of the third generator 330 will be described with reference to FIGS. 5A to 5C.

Figure 5A:
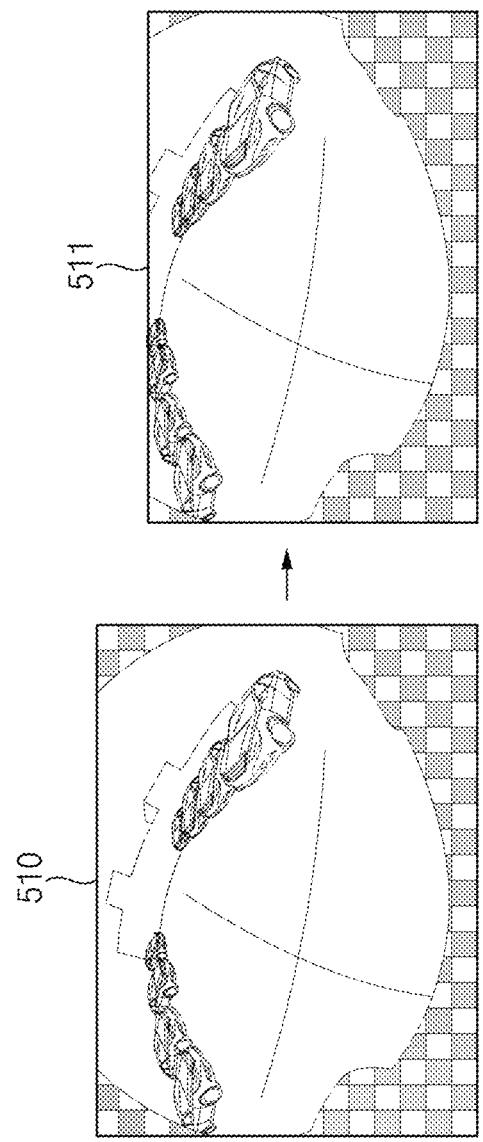
FIG. 5A is a view illustrating a third learning image generated by a third generator provided in an apparatus for learning an image of a vehicle camera in one form of the present disclosure.

FIG. 5A is a view illustrating a third learning image generated by a third generator provided in an apparatus for learning an image of a vehicle camera in one form of the present disclosure.

As shown in FIG. 5A, the third generator 330 generates a third learning image 511 by performing a crop on a first learning image 510.

Figure 5B:
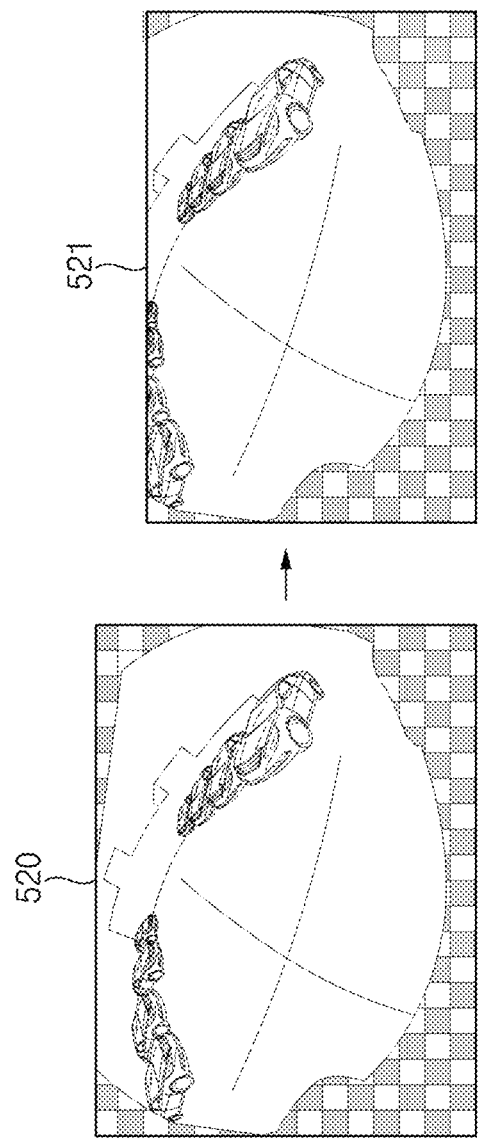
FIG. 5B is a view illustrating a fourth learning image generated by a third generator provided in an apparatus for learning an image of a vehicle camera in one form of the present disclosure.

FIG. 5B is a view illustrating a fourth learning image generated by the third generator provided in an apparatus for learning an image of a vehicle camera in one form of the present disclosure.

As shown in FIG. 5B, the third generator 330 crops a second learning image 520 to generate a third learning image 521. In this case, the second learning image 520 is an image generated by the second generator 320, and after rotating the source image input from the image input device 20 clockwise at a specified angle, the second generator 320 masks the fixed area in the rotated source image to generate the second learning image 520.

Figure 5C:
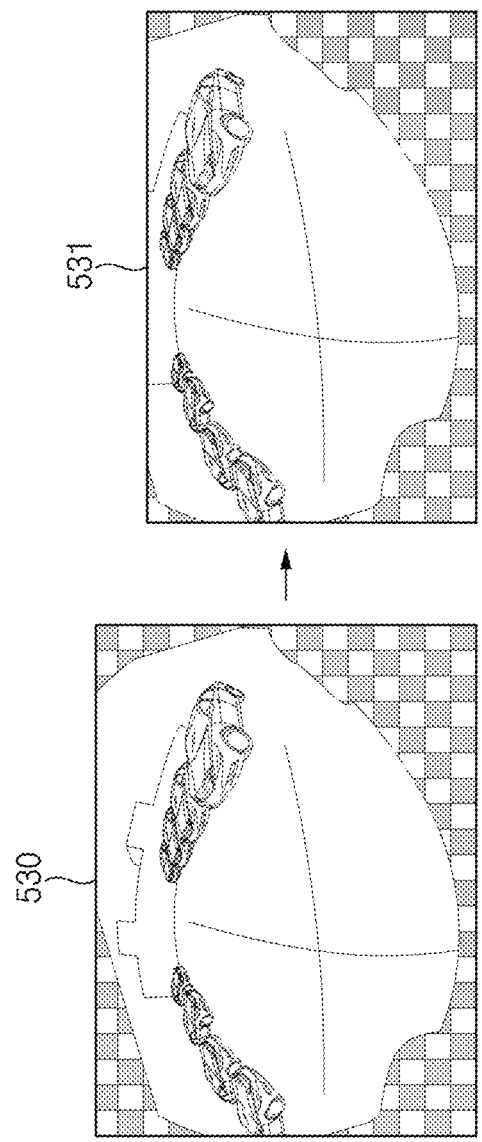
FIG. 5C is a view illustrating another example of a fourth learning image generated by a third generator provided in an apparatus for learning an image of a vehicle camera in one form of the present disclosure.

FIG. 5C is a view illustrating another example of the fourth learning image generated by the third generator provided in an apparatus for learning an image of a vehicle camera in one form of the present disclosure.

As shown in FIG. 5C, the third generator 330 crops a second learning image 530 to generate a third learning image 531. In this case, the second learning image 530 is an image generated by the second generator 320, and after rotating the source image received from the image input device 20 counterclockwise at a specified angle, the second generator 320 masks the fixed area in the rotated source image to generate the second learning image 530.

Figure 6A:
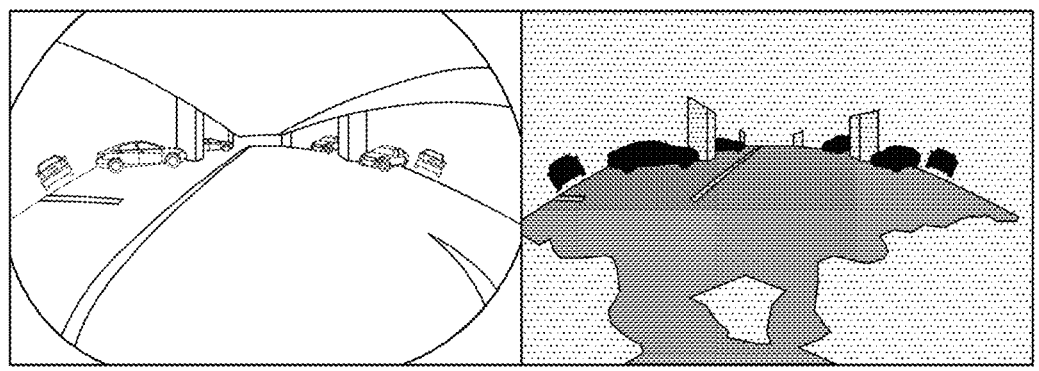
FIG. 6A is a view illustrating that the related art fails to properly classify a space.
Figure 6B:
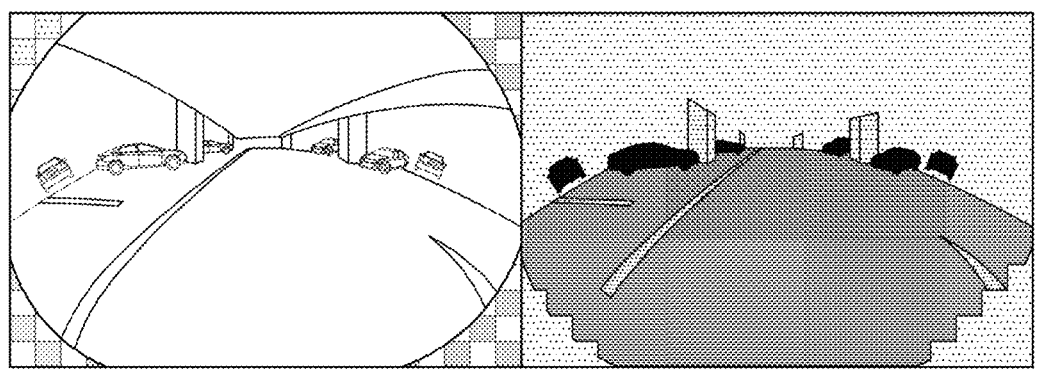
FIG. 6B is a view illustrating that a space is normally classified by an apparatus for learning an image of a vehicle camera in one form of the present disclosure.

FIG. 6B is a view illustrating the performance of an apparatus for learning an image of a vehicle camera in one form of the present disclosure.

As shown in FIG. 6A, the related art fails to properly classify a space, whereas the forms of the present disclosure can normally classify a space.

Figure 7A:
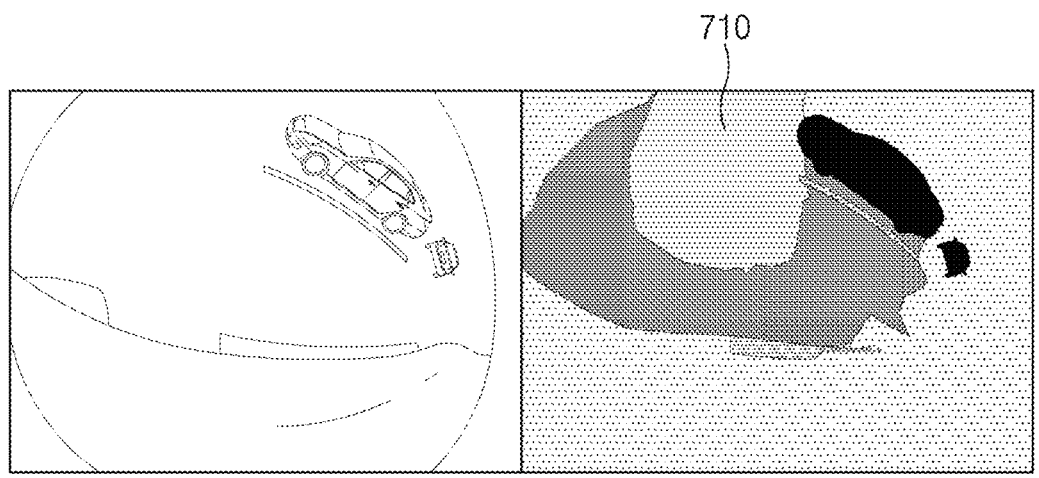
FIG. 7A is a view illustration an image in the related art.
Figure 7B:
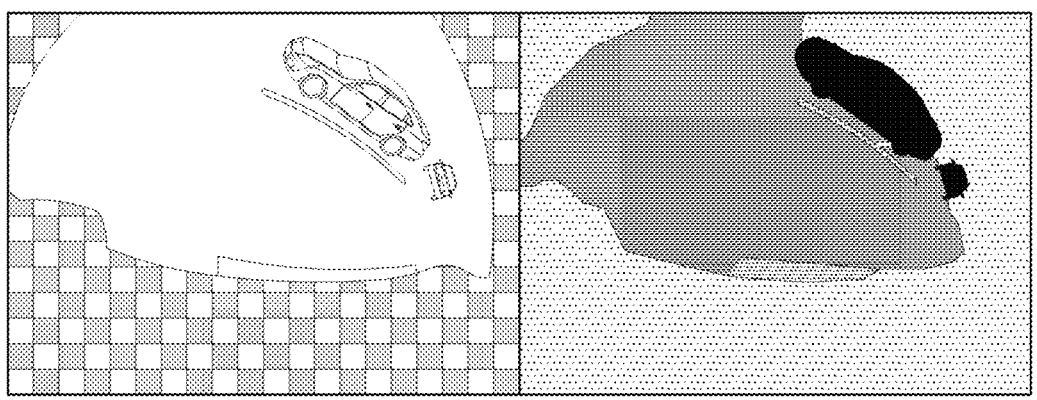
FIG. 7B is view illustrating another example of the performance of an apparatus for learning an image of a vehicle camera in one form of the present disclosure.

FIG. 7B is view illustrating another example of the performance of an apparatus for learning an image of a vehicle camera in one form of the present disclosure.

As shown in FIG. 7A, the related art distinguishes and recognizes an object 710 that does not actually exist, whereas the forms of the present disclosure recognizes only a normally existing space.

Figure 8:
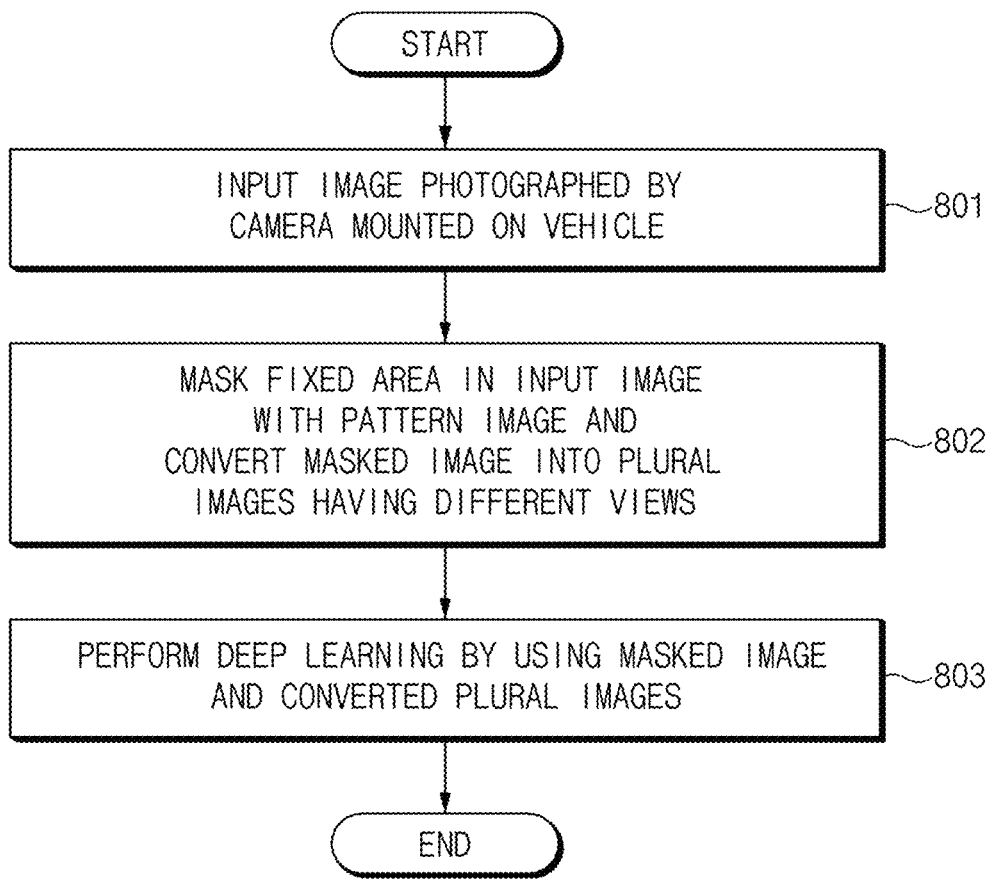
FIG. 8 is a flowchart illustrating a method of learning an image of a vehicle camera in one form of the present disclosure.

FIG. 8 is a flowchart illustrating a method of learning an image of a vehicle camera in one form of the present disclosure.

First, in operation 801, the image input device 20 inputs an image photographed by a camera mounted on a vehicle.

Thereafter, in operation 802, the controller 30 masks the fixed area in the image input from the image input device 20 with a pattern image, and converts the masked image into a plurality of images having different views.

Thereafter, in operation 803, the controller 30 performs deep learning by using the masked image and the converted plurality of images.

Figure 9:
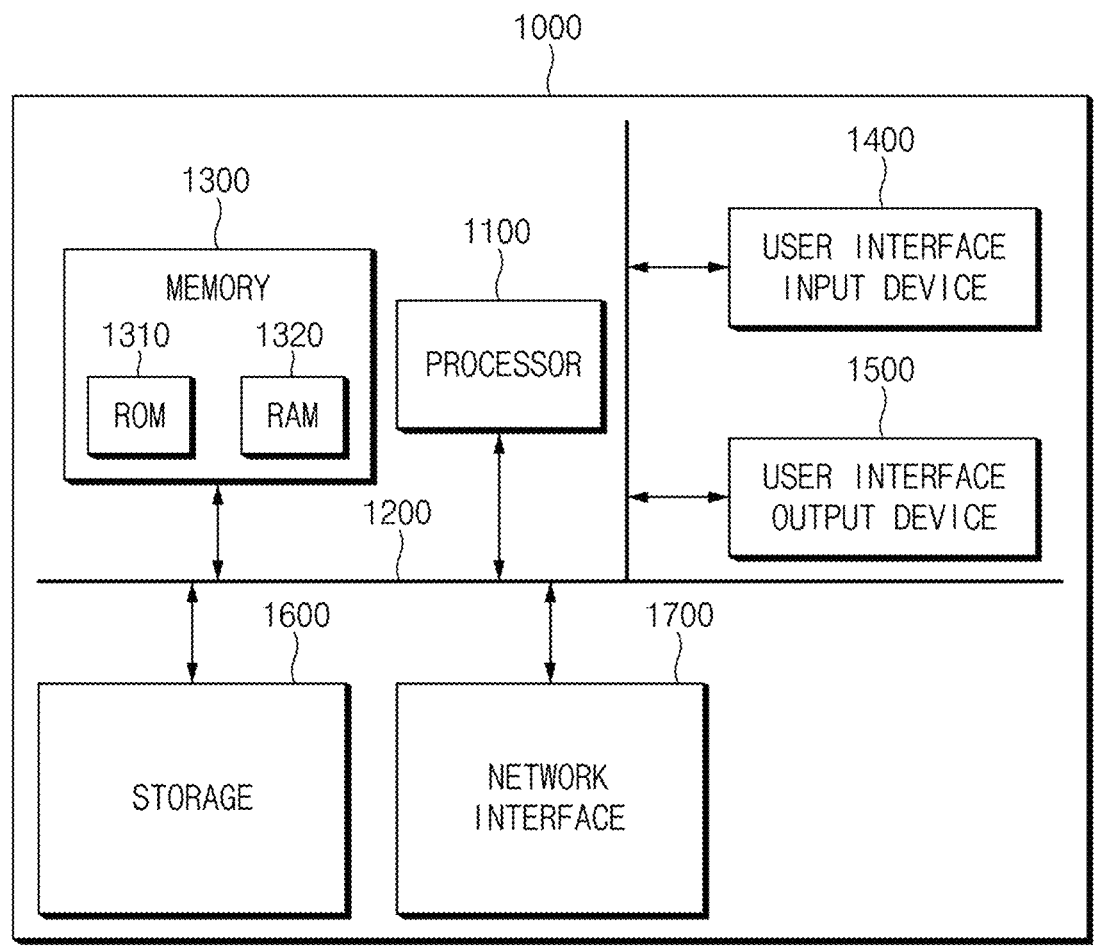
FIG. 9 is a block diagram illustrating a computing system for executing a method of learning an image of a vehicle camera in one form of the present disclosure.

FIG. 9 is a block diagram illustrating a computing system for executing a method of learning an image of a vehicle camera in one form of the present disclosure.

Referring to FIG. 9, as described above, a method of learning an image of a vehicle camera in one form of the present disclosure may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the forms of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the exemplary forms of the present disclosure, there are provided an apparatus for learning an image of a vehicle camera and a method thereof, which can apply a result of deep learning to all vehicles regardless of the color of a vehicle and the mounting angle (yaw, roll and pitch) of a camera by masking a fixed area with a pattern image in an image acquired through a camera mounted on a vehicle, converting the masked image into a plurality of images having different views, and performing deep learning by using the masked image and the converted plurality of images.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed forms of the present disclosure do not limit the technical spirit of the present disclosure but are illustrative, and the scope of the technical spirit of the present disclosure is not limited by the forms of the present disclosure. The scope of the present disclosure should be construed by the claims, and it will be understood that all the technical spirits within the equivalent range fall within the scope of the present disclosure.

What is claimed is:

1. An apparatus for learning an image of a vehicle camera, the apparatus comprising:
    an image input device configured to input an image photographed by a camera mounted on a vehicle; and
    a controller configured to:
        mask a fixed area in the input image with a pattern image,
        convert the input image masked with the pattern image into a plurality of images having different views, and
        perform deep learning by using the input image masked with the pattern image and using the converted plurality of images,
    wherein the controller converts the input image masked with the pattern image by generating a first learning image by masking the fixed area in the image received from the image input device, a second learning image by rotating the image received from the image input device by a reference angle and masking the fixed area in the rotated image, a third learning image by cropping the first learning image, or a fourth learning image by cropping the second learning image, and
    wherein the controller is further configured to:
        rotate the image received from the image input device by the reference angle,
        rotate a binary mask image by the reference angle,
        multiply the reference angle rotated image by the reference angle rotated binary mask image to generate a first image in which the fixed area is removed,
        invert the reference angle rotated binary mask image to generate an inverse rotated binary mask image,
        multiply the pattern image by the inverse rotated binary mask image to generate a second image in which the fixed area is the pattern image, and
        add the first image to the second image to generate the second learning image in which the fixed area in the reference angle rotated image is replaced with the pattern image.

2. The apparatus of claim 1, wherein the image input device is configured to input, to the controller, at least one of a front image, a rear image, a left image, or a right image photographed by the camera.

3. The apparatus of claim 1, wherein the controller is configured to perform the deep learning based on at least one image among the first, second, third, and fourth learning images.

4. The apparatus of claim 1, wherein the controller is configured to:
    multiply the image input by a binary mask image to generate a first image in which the fixed area is removed,
    invert the binary mask image to generate an inverse binary mask image,
    multiply the pattern image by the inverse binary mask image to generate a second image in which the fixed area is composed of the pattern image, and
    add the first image and the second image to generate the first learning image in which the fixed area in the image received from the image input device is replaced with the pattern image.

5. The apparatus of claim 1, wherein the controller is configured to:
    rotate the image received from the image input device in a clockwise direction by the reference angle,
    generate the second learning image by masking the fixed area in the rotated image, and
    generate the fourth learning image by cropping the generated second learning image.

6. The apparatus of claim 1, wherein the controller is configured to:
    rotate the image received from the image input device in a counterclockwise direction by the reference angle,
    generate the second learning image by masking the fixed area in the rotated image, and
    generate the fourth learning image by cropping the generated second learning image.

7. A method of learning an image of a vehicle camera, the method comprising:
    inputting, by an image input device, an image photographed by a camera mounted on a vehicle;
    masking, by a controller, a fixed area in the input image with a pattern image and converting the input image masked with the pattern image into a plurality of images having different views; and performing, by the controller, deep learning by using the input image masked with the pattern image and using the converted plurality of images, wherein converting the input image masked with the pattern image includes:

generating a first learning image by masking the fixed area in the input image received from the image input device;

generating a second learning image by rotating the input image by a reference angle and masking the fixed area in the rotated image;

generating a third learning image by cropping the first learning image; and generating a fourth learning image by cropping the second learning image, and wherein generating the second learning image includes:

rotating the input image by the reference angle;

rotating a binary mask image by the reference angle;

multiplying the reference angle rotated image by the reference angle rotated binary mask image to generate a first image in which the fixed area is removed;

inverting the reference angle rotated binary mask image to generate an inverse rotated binary mask image;

multiplying the pattern image by the inverse rotated binary mask image to generate a second image in which the fixed area is the pattern image; and adding the first image to the second image to generate the second learning image in which the fixed area in the reference angle rotated image is replaced with the pattern image.

8. The method of claim 7, wherein the inputting of the image includes:

inputting a front image of the vehicle;
inputting a rear image of the vehicle;
inputting a left image of the vehicle; and
inputting a right image of the vehicle.

9. The method of claim 7, wherein performing the deep learning includes:

performing the deep learning based on at least one image among the first, second, third and fourth learning images.

10. The method of claim 7, wherein generating the first learning image includes:

multiplying the input image by a binary mask image to generate a first image from which the fixed area is removed;

inverting the binary mask image to generate an inverse binary mask image;

multiplying the pattern image by the inverse binary mask image to generate a second image in which the fixed area is composed of the pattern image; and adding the first image and the second image to generate the first learning image in which the fixed area in the input image is replaced with the pattern image.

11. The method of claim 7, wherein generating the fourth learning image includes:

rotating the input image in a clockwise direction by the reference angle, and generating the fourth learning image by cropping the second learning image generated by masking the fixed area in the rotated image.

12. The method of claim 7, wherein generating the fourth learning image includes:

rotating the input image in a counterclockwise direction by a reference angle, and generating the fourth learning image by cropping the second learning image generated by masking the fixed area in the rotated image.

13. A method of learning an image of a vehicle camera, the method comprising:

inputting, by an image input device, an image photographed by a camera mounted on a vehicle;

randomly performing, by a controller, at least one operation among a plurality of operations, wherein the plurality of operations includes: a first operation of generating a learning image by masking a fixed area in the input image, a second operation of generating a learning image by rotating the input image by a reference angle and masking the fixed area in the rotated image, a third operation of generating an image by masking the fixed area in the input image to generate a learning image by cropping the generated image, a fourth operation of generating an image by rotating the input image by the reference angle and masking the fixed area in the input image to generate a learning image by cropping the generated image; and performing, by the controller, deep learning by using the generated learning image, wherein the second operation includes:

rotating the input image by the reference angle;

rotating a binary mask image by the reference angle;

multiplying the reference angle rotated image by the reference angle rotated binary mask image to generate a first image in which the fixed area is removed;

inverting the reference angle rotated binary mask image to generate an inverse rotated binary mask image;

multiplying a pattern image by the inverse rotated binary mask image to generate a second image in which the fixed area is the pattern image; and adding the first image to the second image to generate the second learning image in which the fixed area in the reference angle rotated image is replaced with the pattern image.

14. The method of claim 13, wherein the first operation includes:

multiplying the input image by a binary mask image to generate a first image from which the fixed area is removed;

inverting the binary mask image to generate an inverse binary mask image;

multiplying the pattern image by the inverse binary mask image to generate a second image in which the fixed area is composed of the pattern image; and adding the first image to the second image to generate a first learning image in which the fixed area in the input image is replaced with the pattern image.

* * * * *